United States Patent [19]

Ferrand

[11] 4,002,087
[45] Jan. 11, 1977

[54] MACHINE CRANK-SHAFT WITH IMPROVED DYNAMIC BALANCE RATIO

[75] Inventor: Michel Ferrand, Ecouen, France

[73] Assignee: Societe d'Etudes de Machines Thermiques - S.E.M.T., Saint Denis, France

[22] Filed: May 12, 1975

[21] Appl. No.: 576,560

[30] Foreign Application Priority Data

May 31, 1974 France .................. 74.19053

[52] U.S. Cl. .................. 74/595; 74/603
[51] Int. Cl.² .................. F16F 15/10
[58] Field of Search .................. 74/603, 595, 596; 123/52 R

[56] References Cited
UNITED STATES PATENTS

| | | | |
|---|---|---|---|
| 2,680,427 | 6/1954 | Summers | 74/603 X |
| 3,039,447 | 6/1962 | Lang | 74/603 X |
| 3,161,079 | 12/1964 | Okamura et al. | 74/603 |

FOREIGN PATENTS OR APPLICATIONS 850,966  9/1952  Germany .................. 74/603

Primary Examiner—Benjamin W. Wyche
Assistant Examiner—F. D. Shoemaker
Attorney, Agent, or Firm—Kenyon & Kenyon Reilly Carr & Chapin

[57] ABSTRACT

A balanced multiple-throw crank-shaft wherein the free forces of the first and second orders forming resultants for the whole crank-shaft of the forces produced by each coupling are substantially zero and at least some of the crank-throws are shifted or offset angularly, respectively, by such a small angle in one direction of rotation and by such an amount relative to the corresponding circumferentially uniformly distributed angular positions they would assume in a configuration with angularly equally spaced crank-throws in orthogonal projection on a plane perpendicular to the geometrical spin axis of rotation of said crank-shaft that an improved balancing ratio will result therefrom.

1 Claim, 1 Drawing Figure

$$\alpha = \frac{360°}{7} = 51°4286$$

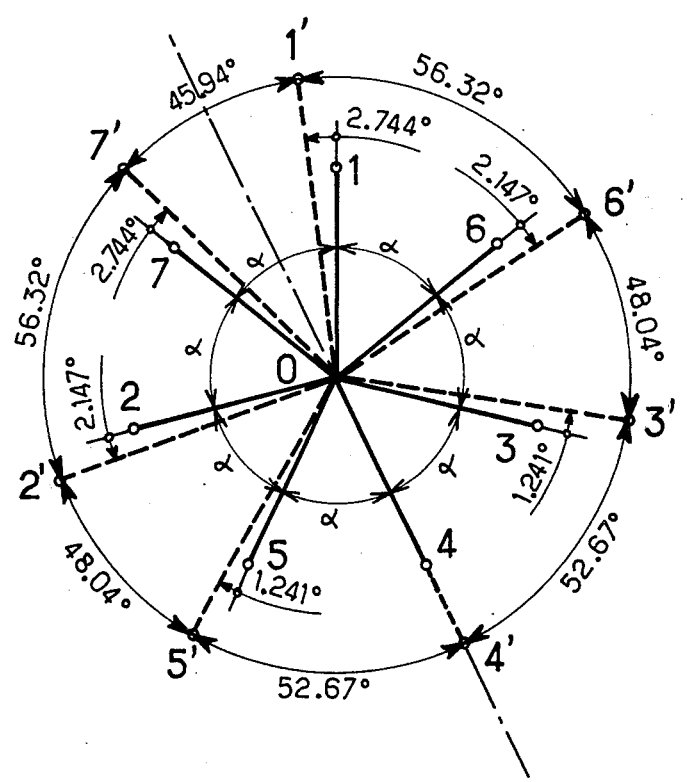
$$\alpha = \frac{360°}{7} = 51°.4286$$

MACHINE CRANK-SHAFT WITH IMPROVED DYNAMIC BALANCE RATIO

The present invention relates generally to and has for its essential subject matter an improved rotary multiple-throw crank-shaft with counter-balancing weights and an improved in particular dynamic balance ratio for a rotating machine having reciprocating pistons, wherein each wrist-pin between each pair of crank-arms is coupled pivotally either to one single connecting rod big end or pitman-head or to a pair of connecting rod big ends or pitman-heads placed side by side in juxtaposed relationship so as to respectively have their bearings on a same wrist pin journal. It also relates to the various applications and uses resulting from placing said device into practice and to the systems, assemblies, apparatus, power machines and drive engines or driven machines, equipments, arrangements and plants provided with such devices. The invention is thus applicable in particular to crank-shafts of two-stroke or four-stroke cycle multiple cylinder internal combustion engines or also in particular to crank-shafts of multiple cylinder compressors or pumps either with several cylinders arranged in line in a longitudinal bank or row or with twice as high a number of cylinders distributed in two longitudinal rows or banks each having the same number of cylinders disposed in a V-arrangement. The invention is applicable to a crank-shaft with for instance an odd number of throws or center cranks for a four-stroke cycle internal combustion engine or possibly with an even number of throws or center-cranks for a two-stroke cycle internal combustion engine. The invention relates still further more specifically to a seven-throw crank-shaft for a rotating machine with reciprocating pistons having seven cylinders arranged in line or 14 cylinders distributed in two rows or banks of seven cylinders disposed in V-arrangement.

In the prior state of the art it is known that the shape of a crank-shaft with for instance seven throws or center-cranks manufactured as by hot working or forging and generally adapted for use in four-stroke cycle internal combustion engines exhibits at least in orthogonal projection onto a plane perpendicular or normal to the geometrical spin axis of rotation of the crank-shaft a configuration in which the crank throws are arranged successively in the firing order 1-6-3-4-5-2-7 and are angularly equidistant or equally spaced apart from each other, i.e. their respective angular positions corresponding to that timing order or sequence are uniformly distributed circumferentially. Under such conditions the angular spacings between any two neighbouring crank-throws in the aforesaid firing order or sequence have substantially each one the value $\alpha = (360°/7) = 51.4286°$.

Such a crank-shaft is selected on account of its natural static and dynamic balance ratio which is one of the best among the crank-shafts the crank-throw distribution of which is regular, i.e. which exhibit equal angles between successive crank-throws in the circumferential order of succession previously stated.

It should be noted that the balancing ratio is defined by the value or magnitude of the resultants of the forces and moments developed by the inertial forces of each coupling system (piston-connecting rod assembly). The design computation is generally limited to the second order of the decomposition or expansion in a Fourier's series of the cyclic function representing the variation in the forces against time. With the aforesaid conventional crank-shaft when it is fitted with identical or like counterweights the balancing ratio is the following:

| | | |
|---|---|---|
| $F_1 = 0$ | $M_1 = 0.267\, P_1 \cdot L$ | $M'_1 = 2.524\, P_1 \cdot L$ |
| $F_2 = 0$ | $M_2 = 1.006\, P_2 \cdot L$ | $M'_2 = 0.526\, P_2 \cdot L$ | where:

$P_1$ and $P_2$ stand for the inertial forces of the first and second orders, respectively, developed by a complete coupling system;

$L$ stands for the distance which separates any two successive coupling systems;

$F$ stands for the resultant free force as considered for the whole crank-shaft of the forces developed by each coupling system;

$M$ stands for the resultant free moment of all the inertial forces with respect to the middle point of the crank-shaft; and $M'$ stands for the maximum value of the inner bending moment determined along the crank-shaft; as this maximum bending moment generally occurs at the middle point of the crank-shaft $M'$ is defined as being the resultant moment with respect to the middle point of the crank-shaft of the inertial forces developed by one half of this crank-shaft.

With a slow operating engine having for instance a rated rotational speed lower than 300 r.p.m. the aforementioned values are considered as being small enough. With a medium speed engine having for instance a rated rotational speed lying between about 300 r.p.m. and about 700 r.p.m. it may be necessary to decrease the free moment $M_1$ resulting from all the inertial forces of the first order with respect to the middle point of the crank-shaft. This is generally obtained by providing the crank-throws of the crank-shaft and in particular the side jaws or cheeks forming the radial arms thereof respectively with different accurately computed counterweights. The cancellation of or the total offset of or compensation for this resultant moment $M_1$ may, however never be achieved except for the particular case of engines with two longitudinal rows or banks of cylinders placed transversely in V-arrangement with a right angle (90°) between the two banks.

The main object of the invention is to overcome this inconvenience by providing an improvement in the natural balancing ratio of the crank-shaft with a plurality of for instance seven crank-throws of the aforesaid kind wherein the free forces $F_1$ and $F_2$ of the first and second orders forming resultants for the whole crank-shaft of the forces generated by each coupling system are substantially zero. For this purpose the invention provides a multiple-throw crank-shaft which is characterized in that at least one, each one or some of said crank-throws are individually staggered or offset angularly, respectively, by such a relatively small angle in one direction of rotation and by such an amount relative to the respective corresponding circumferentially uniformly distributed angular positions they would assume in a configuration with angularly equidistant or equally spaced crank-throws at least in orthogonal projection on a plane perpendicular to the geometrical spin axis of rotation of said crank-shaft that an improved balancing ratio will result therefrom.

According to another characterizing feature of the invention and in the case of a crank-shaft with seven crank-throws the latter exhibits an irregular circumferential distribution with unequal mutual spacing angular distances, of said crank-throws at least some of which are individually staggered or offset angularly by such a relatively small angle in one direction of rotation and by such an amount with respect to the respective corresponding circumferentially uniformly distributed angular positions they would assume in an initial configuration with crank-throws angularly spaced equally apart from each other by 51.4286° at least in orthogonal projection on a plane perpendicular or normal to the geometrical spin axis of rotation of said crank-shaft that the free moment $M_1$ resulting from all the inertial forces of the first order developed by a full coupling system with respect to the middle point of said crankshaft be substantially zero and that preferably said balancing counterweights all be substantially alike or identical with or equal to each other.

In said crank-shaft with respective angular positions of said crank-throws which are arranged successively in said orthogonal projection in the firing order or sequence 1-6-3-4-5-2-7 and according to a further characterizing feature of the invention three pairs of such angular positions 1-7,6-2,3-5 are respectively symmetrical in each pair with respect to the longitudinal axial plane of the wrist-pin of the central crank-throw No 4 passing through the geometrical spin axis or rotation of said crank-shaft.

According to still another characterizing feature of the invention each crank-throw of each aforesaid pair of crank-throws 6–2 and 3–5 exhibits an angular offset in the direction of increasing value of the angle of mutual angular spacing smaller than a straight angle (180°) of said crank-throws in each one of said pairs and each crank-throw of said pair of crank-throws 1–7 exhibits an angular offset in the direction of mutually drawing near thereof, i.e. in the direction of decreasing value of their mutual spacing angle smaller than a straight angle.

According to still a further characterizing feature of the invention the respective angular offsets of each crank-throw of said pairs of crank-throws 1–7, 6–2 and 3–5, respectively, are substantially equal to 2.744°, 2.147°, 1.241°.

The new balancing ratio thus obtained for the improved crank-shaft according to the invention is defined by the following numerical values:

| | | |
|---|---|---|
| $F_1 = 0$ | $M_1 = 0$ | $M'_1 = 2.527 \, P_1 \cdot L$ |
| $F_2 = 0$ | $M_2 = 0.921 \, P_2 \cdot L$ | $M'_2 = 0.463 \, P_2 \cdot L$ |

The novel shape of crank-shaft provided by the invention therefore exhibits the advantage of enabling achievement of a practically perfect cancellation of the moment $M_1$ and of no longer requiring the use of special counterweights since all the counterweights must be identical with each other in the present instance.

Moreover this slight modification or alteration of the angular position of each crank-throw with respect to the regularly distributed configuration of the previously known state of the art has no appreciable consequences upon the irregularity of the engine torque or upon the additional stresses or strains arising from the torsional vibrations of the crank-shaft. The firing order of the cylinders (for instance the order 1-6-3-4-5-2-7) is the same as before and although the angular spacings are different by a few degrees it is possible to retain the same arrangement in groups of the cylinders with respect to the exhaust manifolds.

The invention will be better understood and further objects, characterizing features, details and advantages thereof will appear more clearly as the following explanatory description proceeds with reference to the accompanying diagrammatic drawing given by way of non-limitative example only illustrating a presently preferred specific form of embodiment of the invention and wherein the single FIGURE shows an end view of the crank-shaft according to the invention in orthogonal projection on a plane extending at right angles to the longitudinal geometrical spin axis of rotation of the crank-shaft passing through its coaxially aligned or registering bearing journals and reduced to the respective traces of the longitudinal axial planes passing through the longitudinal geometrical centre line axes of the wrist-pins or achievement of and meeting or intersecting at the center on said geometrical axis of rotation the trace of which constitutes the common point of intersection of the respective traces of said planes.

According to the embodiment shown by way of illustrative example in the FIGURE, the latter shows on the one hand by means of continuous solid radial straight lines 01, 06, 03, 04, 05, 02 and 07 radiating in a starlike pattern about the centre 0 representing the trace of the geometrical spin axis of rotation of the crank-shaft, the normal configuration with a regular distribution pattern of a conventional crank-shaft with seven crank-throws symbolized by said rectilinear radial traces, respectively, and uniformly distributed with identical or like successive spacing angles which are each one equal to the value $\alpha = (360°/7) = 51.4286°$.

There has also been shown by means of a diagrammatic sketch superposed onto the same FIGURE and by means of discontinuous straight radial broken lines 01', 06', 03', 04', 05', 02' and 07', respectively, the novel configuration of the crank-shaft with seven crank-throws according to the invention each crank-throw being adapted to be coupled, journaled or pivotally connected either to one single piston connecting rod big end or to two piston connecting rod big ends arranged side by side in juxtaposed relationship to be borne on the same pin of one single crank-wrist. In the drawing the points or dots denoted by the reference numerals 1, 6, 3, 4, 5, 2, 7 or by the reference numerals 1', 6', 3', 4', 5', 2', 7', respectively, stand for the traces of the longitudinal geometrical center lines (extending in parallel relation, respectively, to the geometrical spin axis of rotation 0 of the crank-shaft), respectively, of the crank-pins or wrists of the various crank-throws in the case of the normal known or usual crank-shaft and in the case of the improved crank-shaft according to the invention, respectively, the radial straight lines joining the common centre 0 to these different points or dots, respectively, then symbolizing the respective traces of said axial planes which may be likened to the cheeks or radial arms forming the side jaws of said crank-throws. In order to better distinguish the novel configuration shown in broken lines from the usual configuration or pattern shown in solid lines the crank arms 01', 06', 03', 04', 05', 02' and 07', respectively, of the novel configuration according to the invention have been shown with greater lengths than those of the radial crank-arms 01, 06, 03, 04, 05, 02 and 07, respectively, of the known or old regular configuration.

It is then found that according to the invention the crank-throw 04' remains in coincidence with the angular position of the crank-throw 04 of the known crank-shaft, i.e. it does not undergo any angular shift or offset. The crank-throws 03' and 05' are symmetrically offset or shifted angularly in the direction of their increasing spacings each one by the value 1.241° with respect to their initial position in the known configuration so that in their new angular positions they form now each one an acute angle of 52.67° with the middle or central crank-throw 04'. Also the crank-throws 06' and 02' are each one angularly offset or shifted by the value 2.147° in the direction of their increasing spacing with respect to their respective initial angular positions in the known old configuration, i.e. in the direction of their respectively drawing near or towards the neighbouring crank-throws 03' and 05' so that they now each make an acute angle of 48.04° with these latter. Finally the crank-throws 01' and 07' are angularly offset or shifted by the value 2.744° with respect to their old known angular positions in the direction of their mutual shifts towards or away from the two aforesaid respective neighbouring crank-throws 2' and 6' so that they now make an acute angle of 45.94° with each other and respectively an acute angle of 56.32° with the neighbouring crank-throws 06' and 02'. The new configuration thus obtained is symmetrical with respect to the broken straight line 04' representing the trace of the longitudinal axial plane passing through the geometrical longitudinal center line axis of the crank-pin forming the wrist of the crank-throw 04'.

It should be understood that the invention is not at all limited to the form of embodiment described and shown which has been given by way of illustrative example only. In particular it comprises all the means constituting technical equivalents of the means described as well as their combinations if the latter are carried out according to its gist and used within the scope of the appended claims.

What is claimed is:

1. A seven-throw crank-shaft provided with substantially identical balancing counterweights for a four-cycle internal combustion engine with at least one bank of seven cylinders arranged in a cylindrical position sequence numbered 1-2-3-4-5-6-7 to be fired according to an ignition sequence 1-6-3-4-5-2-7 comprising crank throws whose crank position sequence along said crank-shaft corresponds to said cylinder position sequence and wrist pins for the crank throws and wherein when viewed endwise of said crank-shaft in orthogonal projection on a radial plane perpendicular to the longitudinal axis of rotation of said crank-shaft, said crank-throws are angularly spaced from each other successively arranged about said axis of rotation in the same order as said ignition sequence when travelling in a single circumferential direction about said axis, each of three pairs of said crank-throws 1–7, 6–2, 3–5 being respectively symmetrical with respect to the longitudinal axial center plane passing through the wrist-pin of a middle crank-throw 4 and through said axis of rotation and wherein the crank-throws of said three pairs respectively make angles of 157.03°; 100.71° and 52.67° with said axial center plane as measured from said center plane of said middle crank-throw 4.

* * * * *